United States Patent [19]
Godfrey

[11] Patent Number: 6,091,255
[45] Date of Patent: Jul. 18, 2000

[54] SYSTEM AND METHOD FOR TASKING PROCESSING MODULES BASED UPON TEMPERATURE

[75] Inventor: Gary M. Godfrey, Austin, Tex.

[73] Assignee: Advanced Micro Devices, Inc., Sunnyvale, Calif.

[21] Appl. No.: 09/074,786

[22] Filed: May 8, 1998

[51] Int. Cl.[7] .............................. G01R 27/26; G01K 1/02; G01K 3/00; G01K 7/00

[52] U.S. Cl. ........................ 324/760; 324/763; 324/765; 377/25; 374/102; 374/183; 374/184; 374/170; 374/178; 374/179

[58] Field of Search .................................. 324/760, 763; 377/25; 374/170, 102, 178, 183, 184, 179, 141

[56] References Cited

U.S. PATENT DOCUMENTS

| | | |
|---|---|---|
| 5,406,212 | 4/1995 | Hashinaga ................................ 324/760 |
| 5,473,259 | 12/1995 | Takeda ..................................... 324/760 |
| 5,513,235 | 4/1996 | Douglass .................................. 377/25 |

*Primary Examiner*—Safet Metjahic
*Assistant Examiner*—James C Kerveros
*Attorney, Agent, or Firm*—Conley, Rose & Tayon P.C.; Jeffrey C. Hood; Louis H. Iselin

[57] ABSTRACT

An on-chip thermometer and methods for using the on-chip thermometer to measure a local temperature and to operate an integrated circuit. The on-chip thermometer comprises a clock circuit, a temperature responsive circuit, and a counter. The clock circuit operates at a fixed frequency and generates a fixed frequency clock signal. The temperature responsive circuit, when enabled, generates a signal dependent on local temperature. In response to receiving the clock signal, the temperature responsive circuit generates an output signal. The counter is coupled to receive the output signal from the temperature responsive circuit and the clock signal. The counter then generates a value indicative of a local temperature of the integrated circuit. A method of measuring a local temperature on an integrated circuit comprises generating a clock signal at a fixed frequency, providing the clock signal to a temperature responsive circuit, the temperature responsive circuit generating an oscillating signal comprising a plurality of oscillations dependent on a local temperature of the integrated circuit in response to receiving the clock signal, and counting the oscillations to generate a value indicative of the local temperature. On an integrated circuit including a plurality of processing modules located at respective locations with a plurality of on-chip thermometers, a task delegation module is coupled to each of the on-chip thermometers and the processing modules. Each on-chip thermometer generates a value indicative of a local temperature. The task delegation module receives output values from the on-chip thermometers and assigns processing tasks to the processing modules based on the local temperatures at each respective location.

16 Claims, 5 Drawing Sheets

SYSTEM AND METHOD FOR TASKING PROCESSING MODULES BASED UPON TEMPERATURE

BACKGROUND OF THE INVENTION

1. Field of the Invention

This invention relates to integrated circuits in general and, more particularly, to an on-chip thermometer and methods for using the on-chip thermometer to measure a local temperature on an integrated circuit and to operate the integrated circuit in response to received measurements.

2. Description of Related Art

The concept of integrated circuits (ICs) are generally well known. The ability of manufacturers to place an increasingly large number of transistors on a single IC, or chip, continues to expand. For example, currently chip manufacturers are able to place up to ten million transistors on a single integrated circuit or monolithic substrate. It is anticipated that within several years chip makers will be able to place one billion transistors on a single chip. Thus, computer systems are evolving toward comprising a handful of computer chips, where each computer chip comprises a plurality of functions. The integration of a plurality of modules or functions on a single computer chip requires improved chip architectures. Due to the shorter distances and tighter integration of components on a chip, the operating temperatures of new data transfer architectures are increasing. As the operating temperatures of a chip increase, the lifetime for that chip tend to decrease due to permanent migration of charge carriers. Therefore an improved system and method of operation are necessary to assure that integrated circuits are operated at proper temperatures even when multiple processing modules are present on the integrated circuit.

SUMMARY OF THE INVENTION

The problems outlined above are in large part solved by an on-chip thermometer and methods for measuring a local temperature on an integrated circuit and operating the integrated circuit in response to received measurements. Broadly speaking, the on-chip thermometer comprises a clock circuit, a temperature responsive circuit, and a counter. The clock circuit operates at a fixed frequency and generates a clock signal at the fixed frequency. The temperature responsive circuit couples to the clock circuit and receives the clock signal from the clock circuit. In response to receiving an enable signal, the temperature responsive circuit generates an output signal. In one embodiment, the counter is coupled to receive the output signal from the temperature responsive circuit. The counter then generates a value indicative of a local temperature of the integrated circuit.

In one embodiment, the temperature responsive circuit is a ring oscillator, and the temperature responsive circuit generates an oscillating signal in response to receiving the clock signal. The oscillating signal comprises a plurality of oscillations dependent on a local temperature of the integrated circuit. The oscillations are counted to generate a value indicative of the local temperature.

On an integrated circuit including a plurality of processing modules located at respective locations with a plurality of on-chip thermometers, a task delegation module is coupled to each of the plurality of on-chip thermometers and the plurality of processing modules. Each of the plurality of on-chip thermometers is operable to generate a value indicative of a local temperature of the integrated circuit. The task delegation module receives output values from each of the plurality of on-chip thermometers and assigns processing tasks to each of the plurality of processing modules based on the local temperatures at each respective location.

The on-chip thermometer may include a temperature dependent response curve in a constant, linear, logarithmic or other shape. The curve may vary until a threshold temperature is reached at an upper end of the temperature dependent response curve. Decisions based on local temperatures are dependent upon the temperature threshold being reached or surpassed.

A method of operating an integrated circuit including a plurality of processing modules located at respective locations and a plurality of on-chip thermometers, with one of the on-chip thermometers located proximate to each of the plurality of processing modules, comprises each of these thermometers generating an output signal indicative of the local temperature. A task delegation module receives the outputs from each of the plurality of on-chip thermometers. The task delegation module determines a local temperature for each of the plurality of processing modules. The task delegation module assigns processing tasks to each of the plurality of processing modules based on the local temperatures. The task delegation module may assign a new task to a processing module with a lowest local temperature. The task delegation module may also reassign a processing task from a processing module with a higher temperature to a processing module with a lower temperature or a temperature below the temperature threshold.

BRIEF DESCRIPTION OF THE DRAWINGS

A better understanding of the present invention can be obtained when the following detailed description of the preferred embodiment is considered in conjunction with the following drawings, in which.

Figure 1:
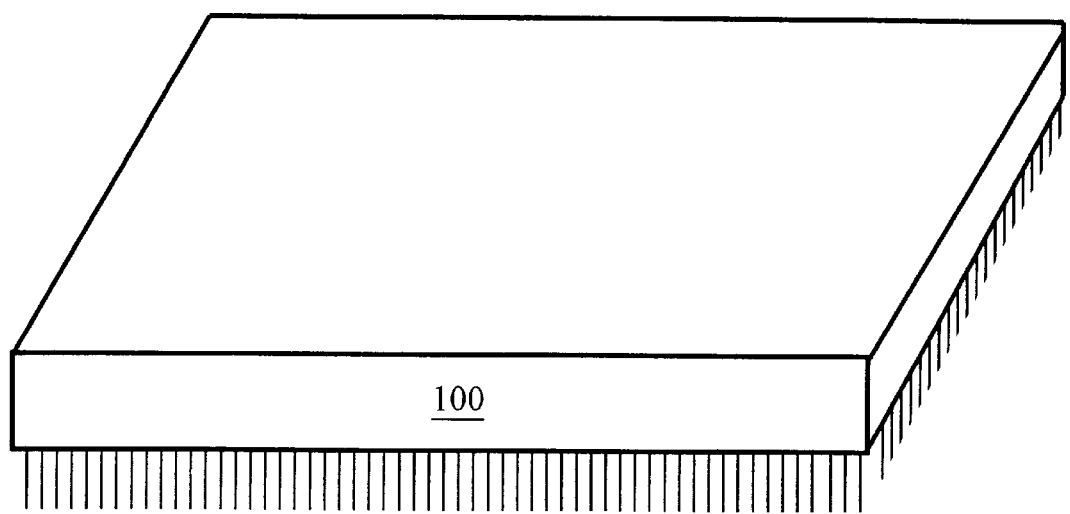
FIG. 1 illustrates a perspective view of an integrated circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF PREFERRED EMBODIMENTS

The use of a letter as part of a number designating a component of a system described in this document will be to show multiple instances of equivalent components. All figures will use a uniform numbering system with identical parts across the figures being given identical numbers. The present invention comprises an on-chip thermometer and methods for measuring a local temperature on an integrated circuit and operating the integrated circuit in response to received measurements.

FIG. 1—Computer Chip

Turning now to the drawings, FIG. 1 shows a computer chip 100 from a perspective view. Computer chip 100 preferably comprises a monolithic silicon substrate comprising a plurality of transistors. The computer chip 100 may also use gallium arsenide (GaAs) or another suitable semiconductor material; the computer chip 100 may also use optical transmission. Although shown as a ceramic socket mount pin grid array (PGA) package, the computer chip 100 may be packaged in any of various ways, including as a surface mount, socket mount, or insertion/socket mount. Materials used in the packaging of computer chip 100 may include ceramic packages, leadless chip carrier packages (LCC), glass-sealed packages, or plastic packages. Actual type of chip package for computer chip 100 may include, ceramic quad flatpack (CQFP), PGA, ceramic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method.

Figure 2:
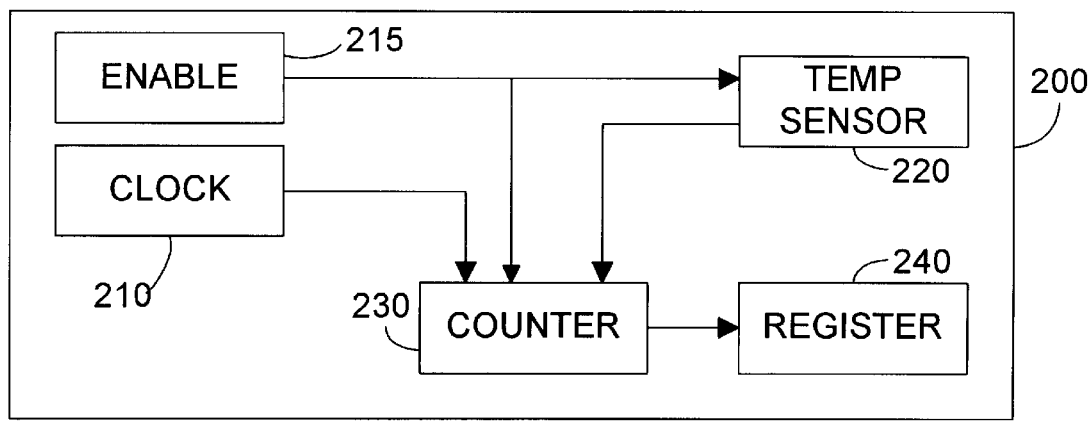
FIG. 2 illustrates an embodiment of a thermometer comprised of a temperature indicating circuit, according to the present invention.

FIG. 2—On-Chip Thermometer

A more detailed look at an on-chip thermometer 200 comprised on the integrated circuit 100 of FIG. 1 is given in FIG. 2. A clock 210, also called a clock circuit, is coupled to a temperature responsive circuit 220, or temperature sensor, and a counter 230. The temperature sensor 220 is also coupled to the counter 230. The counter 230 is optionally coupled to one or more registers 240.

The clock 210 operates at and generates a clock signal at a given frequency. The operation of the clock circuit 210 is preferably temperature independent, that is, changes in temperature do not change the frequency of the clock 210. The clock signal is output to the counter 230 and the temperature responsive circuit 220. Upon receiving an enable signal 215, the temperature responsive circuit 220 generates an output signal and sends the output signal to the counter 230. The counter 230 receives the output signal from the temperature sensor 220 and generates a value indicative of the local temperature of the integrated circuit 100. The counter 230 may optionally output the value indicative of the local temperature of the integrated circuit 100 to a register 240. Additional information, such as raw input/output values or time values, may also be output to registers 240.

In a preferred embodiment, the on-chip thermometer 200 of FIG. 2 is located at a first location on the integrated circuit 100 and generates a value indicative of a temperature of the integrated circuit 100 at the first location. In another embodiment, such as that discussed later with respect to FIG. 4, the integrated circuit 100 may include a plurality of on-chip thermometers 200. Each thermometer 200 of the plurality of on-chip thermometers 200 generates a value indicative of the local temperature at the respective location for each of the thermometers 200. Values indicative of local temperatures may be calibrated values on standard temperature scales, such as kelvin, or may be uncalibrated raw values, as desired.

The temperature responsive circuit 220 of the on-chip to thermometer 200 may be any circuit or device which outputs a signal which varies according to temperature or change in temperature. Such circuits or devices include temperature sensors and temperature transducers, including but not limited to thermistors, thermocouples, resistance temperature detectors, radiation thermometers/pyrometers and semiconductor devices which inherently measure or indicate temperatures or changes in temperatures, as well as circuits which simply react to temperature or changes in temperature. The temperature responsive circuit 220 is contemplated as being integrated into the semiconductor integrated circuit 100, but the temperature responsive circuit 220 may also be physically separate from the integrated circuit 100 and only coupled to the integrated circuit 100 at desired locations.

FIG. 3—Oscillator

Figure 3A:
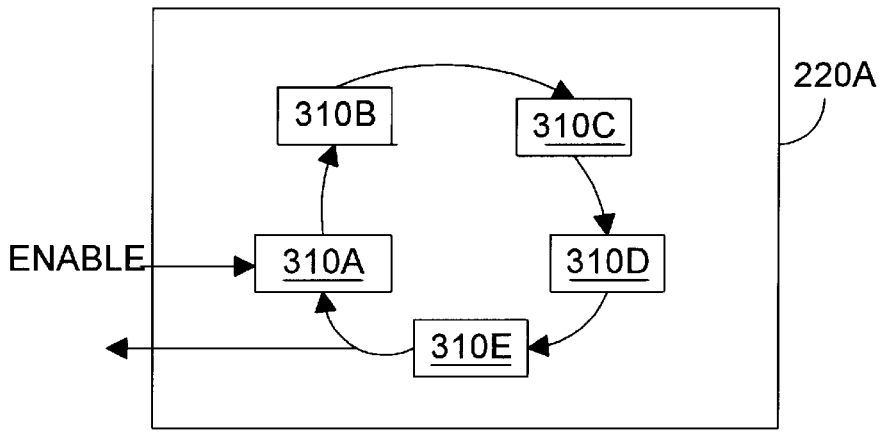
FIGS. 3A and 3B illustrate embodiments of the temperature indicating circuit shown in FIG. 2, according to the present invention.
Figure 3B:
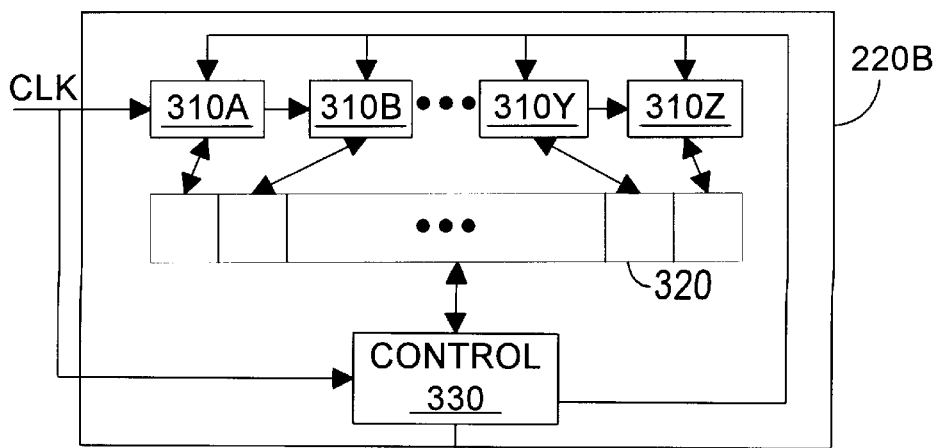

The preferred embodiment of the temperature sensor 220 is shown in FIG. 3A, a ring oscillator 220A comprised of a plurality of connected logic inverters 310A–310E, preferably an odd plurality. An enable signal activates the ring oscilator. Another embodiment of temperature sensor 220 is shown in FIG. 3B, a delay chain 220B comprised of logic inverters 310A–310Z, registers 320, and a control module 330. As the clock signal (CLK) is input into the delay chain of inverters 310A–310Z, the inverters 310 change state and pass the clock signal along to the next inverter 310. The clock signal is passed down the chain of inverters 310. The current state of the inverters 310 is passed to registers 320. At the next clock signal, a control module 330 latches the contents of the registers 320 and resets the registers 320. As the temperature increases in the region of the temperature responsive circuit 220B, the speed of the delay chain 220B will slow. Thus as the local temperature increases, the number of inverters 310 which change state between a to clock cycles decreases. Control module 330 operates to determine changes in the number of inverters that change state between any two clock cycles. Although only two embodiment are illustrated, it is contemplated that temperature responsive circuit 220 may be comprised of any circuit that outputs a temperature or temperature-change dependent signal.

The shape of the curve representing the output signal of the temperature responsive circuit 220 as a function of temperature may be linear, logarithmic, or other shape. The curve may also be constant until a threshold temperature is reached before changing with temperature. The threshold temperature represents an upper limit to the region of constant value as a function of temperature.

Figure 4:
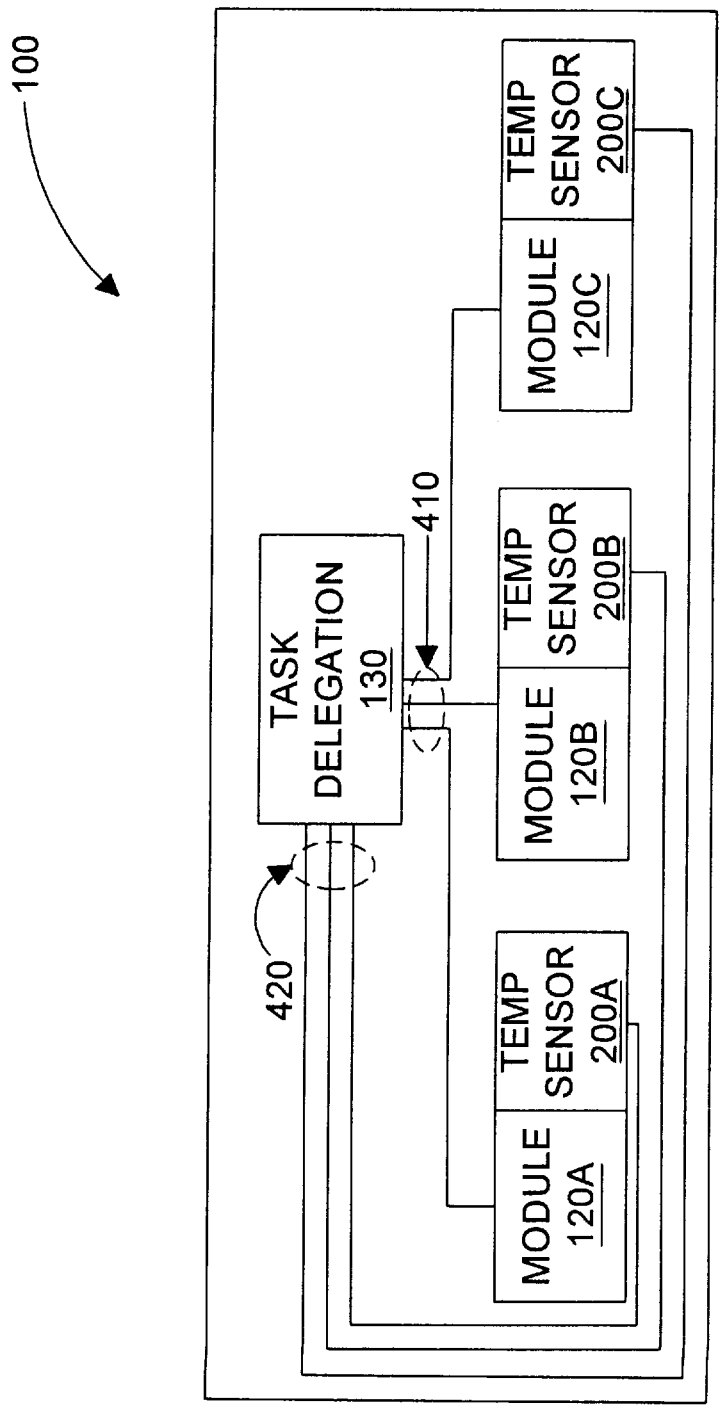
FIG. 4 illustrates an embodiment of the integrated circuit shown in FIG. 1, according to the present invention.

FIG. 4–Integrated Circuit

Illustrated in FIG. 4 is an integrated circuit 100 comprising a plurality of processing modules 120, a plurality of on-chip thermometers 200, and a task delegation module 130 coupled to each of the on-chip thermometers 200 and the processing modules 120. Each of the plurality of processing modules 120 is located at a respective location in the integrated circuit 100. Each of the plurality of on-chip thermometers 200 is located proximate to one of the processing modules 120. Each of the on-chip thermometers 200 is also operable to generate a value indicative of a local temperature of the integrated circuit 100 at its location. The task delegation module 130 is operable to receive the output signals from each of the on-chip thermometers 200, as shown at 420. The task delegation module 130 determines a local temperature for each of the processing modules 120 and operates to assign processing tasks, both continuing and new, to each one of the plurality of processing modules 120 based on the local temperatures, as shown at 410.

In one embodiment, the on-chip thermometers 200 are each comprised of one or more circuits which operate at a given speed. The speed of at least one of the circuits in each thermometer changes as the circuits are exposed to changes in local temperature. In one embodiment, shown in FIG. 3A, each of the on-chip thermometers includes a clock 210 coupled to a temperature responsive circuit 220, and a counter 230. The temperature responsive circuit 220 is also coupled to the counter 230. The counter 230 is optionally coupled to one or more registers 240. The temperature responsive circuit 220 is preferably a ring oscillator, but it is contemplated that other circuits may be used, as shown in FIG. 3B. Desirable properties of the temperature responsive circuit 220 may include an operating speed that is substantially constant over an operating temperature range, with the operating speed slowing as the local temperature increases beyond the threshold, or upper limit, of the operating temperature range. Besides temperature responsive circuits 220 as disclosed, any temperature sensing device may also be used, as noted above.

Figure 5:
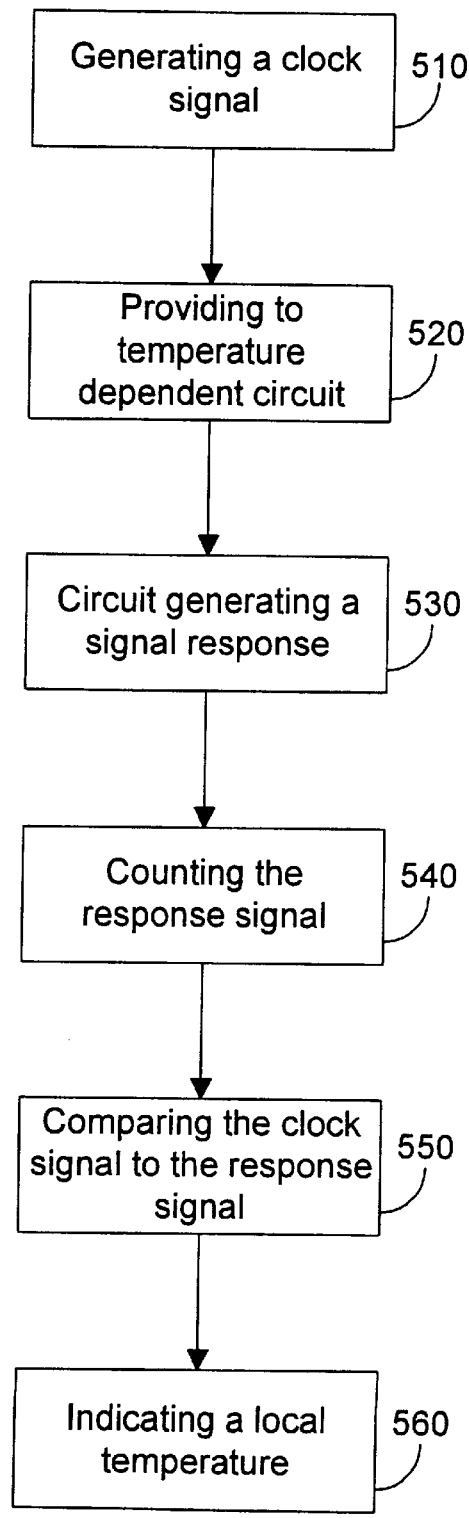
FIG. 5 illustrates an embodiment of a flow chart of a method for indicating a local temperature.

FIG. 5—Method of Measuring a Local Temperature

FIG. 5 illustrates an embodiment of a flowchart describing a method of measuring a local temperature. The method comprises the following. First, generating a clock signal 510. Next, the method provides the clock signal to the temperature responsive circuit 520. The temperature responsive circuit generates a signal in response to receiving the clock signal 530. The method then counts the response signal from the temperature responsive circuit 540. The method next compares the rate or frequency of the clock signal to the response signal from the temperature responsive circuit 550. Finally, the method indicates a local temperature based on the comparison between the clock signal and the response signal from the temperature responsive circuit 560. In one embodiment, the clock signal is counted in parallel with the response signal from the temperature responsive circuit. In another embodiment, counting the clock signal while counting the output signal indicates the local temperature. In still another embodiment, the output signal may be an oscillating signal from a ring oscillator 220A. Signals from other embodiments of the temperature responsive circuit 220 are contemplated.

Figure 6:
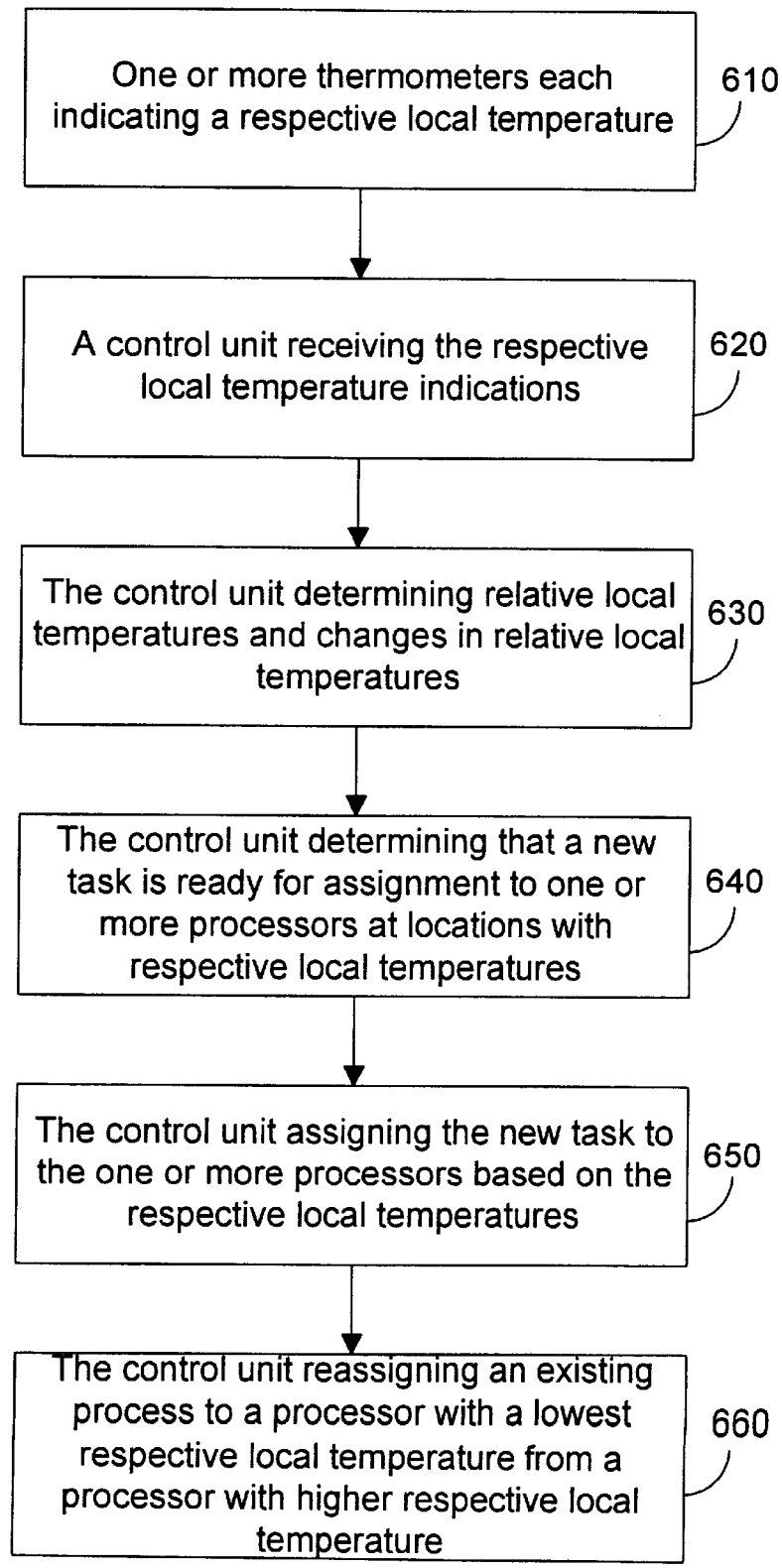
FIG. 6 illustrates an embodiment of a flow chart of a method for operating the integrated circuit of FIG. 1 with local heating and temperatures, according to the present invention.

FIG. 6—Method of Operating the Integrated Circuit

In FIG. 6, an embodiment of a flowchart describing a method of operating the integrated circuit 100 chip is shown. The method is comprised as follows. First, one or more thermometers each indicate a respective local temperature 610. A control unit then receives the respective local temperature indications 620. The control unit next determines relative local temperatures and changes in relative local temperatures 630. The control unit also determines that a new task is ready for assignment to one or more processors at locations with respective local temperatures 640. The control unit assigns the new task to one or more processors based on the respective local temperatures 650. The control unit also re-assigns an existing process to the processor with a lowest respective local temperature from a processor with a higher respective local temperature 660.

Therefore, the present invention comprises an on-chip thermometer and methods for using the on-chip thermometer. Although the system and method of the present invention have been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An integrated circuit, comprising:
   a plurality of processing modules located at respective locations in said integrated circuit;
   a plurality of on-chip thermometers comprised on the integrated circuit, wherein each of said on-chip thermometers is located proximate to one of said processing modules and is operable to generate a value indicative of a local temperature of the integrated circuit; and
   a task delegation module coupled to each of said plurality of on-chip thermometers and operable to receive outputs from each of said plurality of on-chip thermometers, wherein the task delegation module determines a local temperature for each of said plurality of processing modules and operates to assign processing tasks to said plurality of processing modules based on said local temperatures.

2. The integrated circuit of claim 1, wherein each of said on-chip thermometers comprises:
   a clock circuit, wherein said clock circuit operates at a fixed frequency, wherein the clock circuit generates a clock signal at said fixed frequency;
   a temperature responsive circuit coupled to the clock circuit which receives the clock signal from said clock circuit, wherein said temperature responsive circuit generates an output signal; and
   a counter coupled to receive said output signal from said temperature responsive circuit, wherein said counter uses said output signal to generate a value indicative of a local temperature of the integrated circuit.

3. The integrated circuit of claim 2, wherein the temperature responsive circuit is a ring oscillator.

4. The integrated circuit of claim 3, wherein the counter counts a number of oscillations of said ring oscillator, wherein said number of oscillations is indicative of said local temperature of the integrated circuit.

5. The integrated circuit of claim 2, wherein the counter further receives said clock signal, wherein said counter is further operable to generate said value indicative of a local temperature of the integrated circuit using said clock signal.

6. The integrated circuit of claim 1, wherein said plurality of on-chip thermometers comprise a plurality of circuits, wherein each of said plurality of circuits operate at a speed, wherein said speed of each of said plurality of circuits changes as said circuits are exposed to changes of said local temperature.

7. The integrated circuit of claim 6, wherein said speed of each of said plurality of circuits is substantially constant over an operating temperature range, wherein said speed of each of said plurality of circuits slows as said local temperature increases beyond an upper limit of said operating temperature range.

8. The integrated circuit of claim 1, wherein a rate of producing said output signal is responsive to temperature, wherein said rate of producing said output signal slows as the temperature increases.

9. The integrated circuit of claim 1, wherein each of said on-chip thermometers comprises a temperature sensing means.

10. A method of operating an integrated circuit, the integrated circuit comprising a plurality of processing modules located at respective locations in said integrated circuit and a plurality of on-chip thermometers, each of said plurality of on-chip thermometers located proximate to one of said processing modules, the method comprising:

each of said thermometers generating an output signal indicative of a local temperature;

a task delegation module receiving outputs from each of said plurality of on-chip thermometers;

said task delegation module determining a local temperature for each of said plurality of processing modules; and said task delegation module assigning processing tasks to said plurality of processing modules based on said local temperatures.

11. The method of claim 10, wherein said plurality of processing modules comprises a first module having a first associated local temperature and a second module having a second associated local temperature, wherein said plurality of on-chip thermometers comprises a first thermometer proximate to said first module and a second thermometer proximate to said second module, the method further comprising:

said first thermometer indicating said first temperature;

said second thermometer indicating said second temperature, wherein said second temperature is higher than said first temperature;

said task delegation module determining that a new task is ready for assignment;

said task delegation module comparing said first temperature and said second temperature; and said task delegation module assigning said new task to said first module.

12. The method of claim 11, wherein said assigning said new task to said first module is in response to said second temperature is higher than said first temperature.

13. The method of claim 11, wherein said assigning said new task to said first module comprises a part of an operating system allocating said new task to said first module, wherein said operating system governs said plurality of processing modules.

14. The method of claim 11, further comprising:

said task delegation module reassigning processing tasks from said second module to said first module.

15. A method of measuring local temperatures on an integrated circuit, the integrated circuit comprising a plurality of means responsive to temperature and a control means, wherein the plurality of means responsive to temperature includes a first means and a second means, the method comprising:

the first means responding to a first local temperature;

the second means responding to a second local temperature;

the first and second temperature sensing means transferring a plurality of indications of the first and second local temperatures to the control means; and the control means receiving said plurality of indications.

16. The method of claim 15, the method further comprising:

the control means relaying said plurality of indications to a part of an operating system, wherein the operating system controls the operations of said integrated circuit.

* * * * *